INVENTORS
Frederick W. Hay
Russell T. Bigler
BY
ATTORNEY.

United States Patent Office 2,992,490
Patented July 18, 1961

2,992,490
UNIVERSAL TEMPLATE FOR OUTLINING OPENINGS IN WALLBOARD
Frederick W. Hay, 720 Dexter, and Russell T. Bigler, 406 Washington, both of Clay Center, Kans.
Filed Oct. 6, 1958, Ser. No. 765,634
4 Claims. (Cl. 33—174)

The invention relates to the construction of buildings and the installation of electrical equipment therein and more particularly to a template for use in outlining openings in wallboard for electrical outlet and switch boxes.

The most important object of this invention is to provide a single universal template that may be used to outline openings for all basic types of outlet and switch boxes including not only single gang receptacles but double and triple gang receptacles as well.

A further object of the invention is the provision of a universal template comprising a single, flat plate having a series of specially formed openings therein as well as a first and a second pair of opposed outermost edges, the openings and the edges being of such configuration as to provide a number of guiding edges which may be selectively followed to outline the desired opening for an electrical box in a sheet of wallboard.

A yet further aim of this invention is to provide a universal template having as a part thereof means for releasably attaching the template to an electrical box, and a pair of pins extending outwardly from one face of the template for the purpose of creating a guide mark on the wallboard when the same is pressed against the template after it is attached to the electrical box.

Further objects of the invention will become apparent from the following specification and from the accompanying drawing, wherein.

Figure 1:
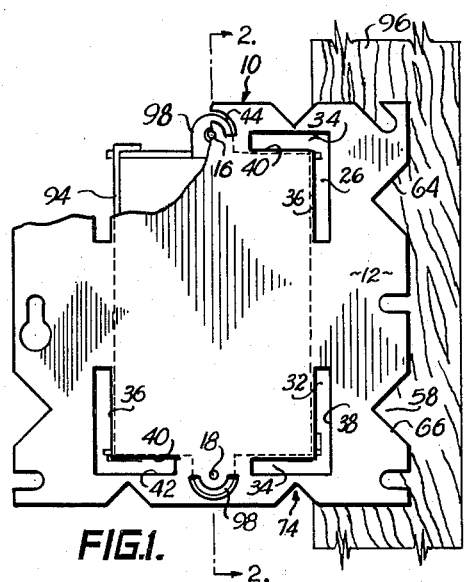
FIGURE 1 is a fragmentary, front elevational view of the template attached to the front of an electrical plug outlet box.

The template embodying the concepts of this invention comprises a substantially square plate 10, formed from a sheet of sturdy material, preferably metal or the like, and having opposed, flat faces 12 and 14 respectively. Extending through and fixedly carried by plate 10 are a pair of pins 16 and 18 respectively, having stud ends 20 and 22 respectively, the pins 16 and 18 extending outwardly from face 12 of the plate and the stud ends extending outwardly from face 14 of plate 10.

Plate 10 has four L-shaped openings 24, 26, 28 and 30 formed therein, the openings 24—30 being so disposed as to substantially define the corners of a rectangle. Each L-shaped opening 24—30 has a long leg 32 and a short leg 34, and each of said legs has an inner and an outer edge, long legs 32 having inner edges 36 and outer edges 38, and short legs 34 having inner edges 40 and outer edges 42.

Pins 16 and 18 are disposed substantially between the ends of legs 34 of openings 24 and 26 and the ends of legs 34 of openings 28 and 30 respectively, there being formed in plate 10 adjacent each of pins 16 and 18 arcuate openings 44 and 46 respectively, said openings being between the pins and the adjacent, outermost edges of plate 10.

Plate 10 has a first pair of opposed outermost edges 48 and 50 and a second pair of opposed outermost edges 52 and 54, said edges combining to define the entire outermost edge of plate 10.

Each of edges 48 and 50 has a pair of spaced apart, substantially triangular indentations formed therein, edge 48 having indentations 56 and 58, and edge 50 having indentations 60 and 62. All of indentations 56—62 are of identical configuration, and each presents a first edge 64 and a second edge 66. Indentations 56 and 60 and 58 and 62 respectively have their apexes in opposed relationship.

Edges 52 and 54 each have a pair of spaced apart, V-shaped notches formed therein, edge 52 having notches 68 and 70 and edge 54 having notches 72 and 74. Said notches 68—74 are of identical configuration, and each has a primary edge 76 and a secondary edge 78. The apexes of notches 68 and 72 and 70 and 74 are in opposed relationship.

Plate 10 also has formed as a part thereof means for releasably attaching the same to an electrical outlet box, these means comprising a pair of angled, screw-receiving slots 80 and 82 formed in edge 52 adjacent the ends thereof; a pair of screw-receiving recesses 84 and 86 formed in edge 50 recess 84 being disposed centrally of said edge 50 and recess 86 being disposed between indentation 62 and the proximal end of edge 50; a third screw receiving recess 88 formed in edge 48 between indentation 58 and the proximal end of edge 48; and a keyhole-shaped, screw-engaging hole 90 in plate 10 adjacent edge 48. Stubs 20 and 22 are also utilized as a means of releasably attaching plate 10 to an electrical outlet box.

In use, appropriate combinations of the above described means are utilized to releasably attach plate 10 to the outer, open end of an electrical box. With plate 10 so positioned a sheet of wallboard 92 is pressed against face 12 of plate 10, the wallboard 92 is thereby pierced by pins 16 and 18 to mark the position of plate 10 and thus the electrical box with respect to wallboard 92. After making the wallboard 92 with pins 16 and 18 it is removed from its position engaging face 12. Plate 10 is then removed from attachment to the electrical box and placed upon the wallboard 92 with the pins 16 and 18 within the holes formed when wallboard 92 was first pressed against said pins. Appropriate pencil guiding edges of plate 10 are then followed to mark the shape of the particular opening desired in wallboard 92, plate 10 is removed from engagement with wallboard 92 and a cutting tool is used to cut away the wallboard along the marked guide lines to form the necessary opening therein.

As is apparent from the drawing, plate 10 may be used to outline openings of various sizes and shapes to conform to the configuration of the particular electrical box to which access is desired through wallboard 92.

Figure 2:
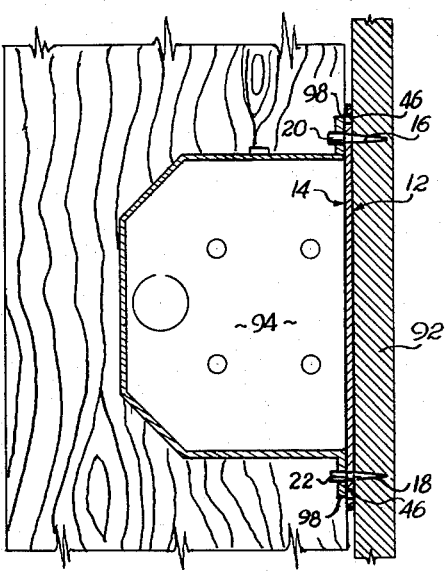
FIG. 2 is a sectional view taken on line 2—2 of FIG. 1.

FIGS. 1 and 2 illustrate plate 10 in a position attached to the outer, open end of a standard outlet box 94 which has been secured to a stud 96 of a building under construction. Box 94 has outwardly extending, perforated ears 98 at the top and bottom thereof, and as best seen in FIG. 2, plate 10 is held in place against the open end of box 94 as a result of stubs 20 and 22 each engaging one of said perforations. After wallboard 92 has been marked by pins 16 and 18 as above explained, guide lines for cutting an access opening in said wallboard compatible with the outer configuration of box 94, can be made by placing plate 10 against wallboard 92 in the manner above mentioned and marking with a suitable instrument along inner edges 40 and 36 of openings 24, 26, 28 and 30, and through arcuate openings 44 and 46. When plate 10 is removed from the wallboard 92, these lines can be interconnected to form a complete outline of box 94, and the outline followed with a cutting tool to create the desired opening in the wallboard.

Figure 3:
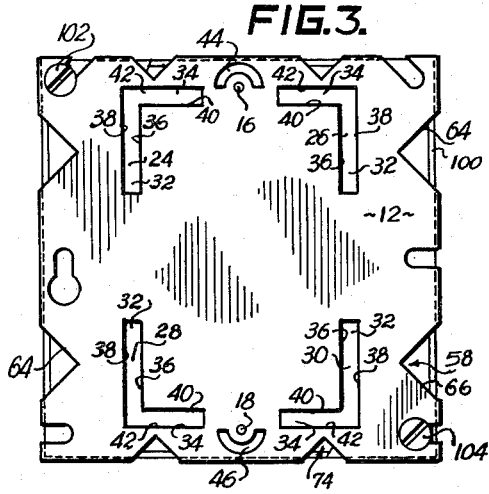
FIG. 3 is a front elevational view of the template attached to another form of an electrical outlet box.
Figure 4:
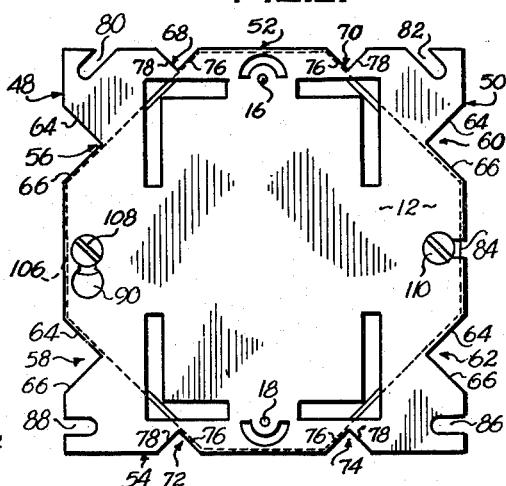
FIG. 4 is a front elevational view of the template attached to still another form of outlet box.

To outline an opening for a square electrical box 100 as shown in FIG. 3, plate 10 is attached to box 100, which is provided with screws 102 and 104, by engaging said screws 102 and 104 with slot 80 and recess 86 respectively. After following the steps hereinbefore described to suitably locate the plate 10 with respect to the wallboard, the desired guide lines are created by marking along the straight, outer portions of edges 48, 50, 52 and 54, these marks then being connected to complete the outline of box 100.

An opening for a standard octagonal box 106 as shown in FIG. 3, is created by first attaching plate 10 to said box 106 as it is held in place within a wall, ceiling or the like, by means of engaging screws 108 and 110, carried by box 106, within hole 90 and recess 84 respectively. The same steps as previously mentioned with respect to marking the wallboard are then taken and the desired cutting guide lines created by marking along that portion of edge 52 between notches 68 and 70, the primary edges 76 of notches 68 and 70, the second edges 66 of indentations 56 and 60, that portion of edges 48 and 50 between indentations 56 and 58 and 60 and 62 respectively, the first edges 64 of indentations 58 and 62, the primary edges 76 of notches 72 and 74 and that portion of edge 54 between notches 72 and 74. The plate 10 may then be removed from engagement with the wallboard and the lines so formed interconnected to create a complete outline of octagonal box 106, which outline is followed to cut the necessary opening in the wallboard.

Figure 5:
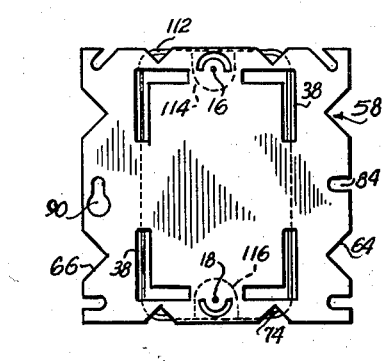
FIG. 5 is a reduced, front elevatonal view showing the template attached to an electrical switch box.

In forming an opening in wallboard to accommodate switch box 112 shown in FIG. 5, which box 112 is provided with a pair of inturned perforated ears 114 and 116, stubs 20 and 22 engage the perforations in ears 114 and 116 respectively to releasably attach plate 10 to the open end of box 112. The wallbord is again suitably marked and the desired guide lines formed by marking along edges 38 of openings 24, 26, 28 and 30 and along that portion of edges 52 and 54 disposed between notches 68 and 70 and 72 and 74 respectively. These lines are then interconnected to complete the outline of box 112 upon the wallboard, and the outline followed in cutting the desired opening. If it is desired to create an opening for box 112 having less sharply angled corners than the rectangular opening with right-angled corners above described, an additional mark may be made along primary edges 76 of notches 68, 70, 72 and 74 and these marks interconnected with those above mentioned.

A single opening can be created for a number of side by side boxes such as 94, 100 or 112 or multi-gang outlet boxes by merely repeating the above described operations, moving plate 10 with each successive marking operation, whereby to outline a single large opening capable of accommodating the desired number and size of boxes. Thus, plate 10 is a universal template and may be used to outline the desired opening for any type or size of electrical box.

Having thus described the invention what is claimed as new and desired to be secured by Letters Patent is:

1. A universal template for use in outlining openings for electrical boxes in wallboard comprising a substantially square flat plate having a pair of opposed faces and a first and second pair of opposed outermost edges, said plate having four L-shaped openings formed therein, said openings defining the corners of a rectangle and having an inner and an outer edge, said first pair of outermost edges of said plate each having a pair of substantially triangular indentations formed therein, the side of each indentation adjacent the other indentation in the same edge defining a portion of one side of an octagon, said indentations in one edge being in opposed relationship to those in the opposite edge, and a pair of pins extending through said plate for engaging the wallboard, a pin being adjacent each of the second pair of opposed edges of said plate, said plate being provided with means for releasably attaching the same to the electrical box.

2. A universal template for use in outlining openings for electrical boxes in wallboard comprising a substantially square flat plate having a pair of opposed faces and a first and second pair of opposed outermost edges, said first pair of edges each having a pair of spaced apart triangular indentations formed therein, the side of each indentation adjacent the other indentation in the same edge defining a portion of one side of an octagon, said second pair of opposed outermost edges each having a pair of V-shaped notches formed therein, the side of each notch adjacent the other notch in the same edge defining a portion of one side of an octagon, the notches in one of said edges being in substantially opposed relationship to those in the other of said edges; and a pair of pins extending through said plate, one of said pins being adjacent each of said second pair of edges respectively, there being an arcuate opening formed in the plate between each of said pins and its adjacent edge, said plate being provided with means for releasably attaching the same to the electrical box.

3. A universal template for use in outlining openings for electrical boxes in wallboard comprising a substantially square, flat plate having a pair of opposed faces and a first and second pair of opposed outermost edges, said first pair of edges each having a pair of triangular indentations formed therein, the side of each indentation adjacent the other indentation in the same edge defining a portion of one side of an octagon, said second pair of edges each having a pair of V-shaped notches formed therein, the side of each notch adjacent the other notch in the same edge defining a portion of one side of an octagon, said plate having means for releasably attaching the same to an electrical box, and a pair of pins extending through said plate for engaging the wallboard when the same is pressed against one of said faces.

4. A universal template for use in outlining openings for electrical boxes in wallboard comprising a substantially square, flat plate having a pair of opposed faces and a first and second pair of opposed outermost edges, said plate having four L-shaped openings, said openings defining the corners of a rectangle and having an inner and outer edge, said first pair of opposed, outermost edges of said plate each having a pair of substantially triangular indentations formed therein, the side of each indentation adjacent the other indentation in the same edge defining a portion of one side of an octagon, said indentations in one edge being in opposed relationship to those in the opposite edge, said second pair of opposed outermost edges of said plate each having a pair of V-shaped notches formed therein, the side of each notch adjacent the other notch in the same edge defining a portion of one side of an octagon, the notches in one of said edges being in opposed relationship to those in the other of said edges; a pin extending through said plate adjacent each of said second pair of edges respectively, there being an arcuate opening formed in the plate between each of said pins and its adjacent edge, the plate being provided with means for releasably attaching the same to the electrical box.

References Cited in the file of this patent

UNITED STATES PATENTS

| | | |
|---|---|---|
| 1,696,149 | Danly | Dec. 18, 1928 |
| 1,724,307 | Peterson | Aug. 13, 1929 |
| 2,229,757 | McEniry | Jan. 28, 1941 |
| 2,458,072 | Hall | Jan. 4, 1949 |
| 2,540,032 | Johnson | Jan. 30, 1951 |
| 2,775,812 | Mohr | Jan. 1, 1957 |
| 2,788,151 | Shore | Apr. 9, 1957 |
| 2,933,818 | Palmer | Apr. 26, 1960 |